(12) United States Patent
Mildt et al.

(10) Patent No.: US 8,113,589 B2
(45) Date of Patent: Feb. 14, 2012

(54) VEHICLE SEAT WITH A ROTATABLE AND ESSENTIALLY DISPLACEABLE BACKREST

(75) Inventors: Helmut Mildt, Lindlar (DE); James Abraham, Cologne (DE)

(73) Assignee: Johnson Controls Technology Company, Holland, MI (US)

( * ) Notice: Subject to any disclaimer, the term of this patent is extended or adjusted under 35 U.S.C. 154(b) by 259 days.

(21) Appl. No.: 12/401,520

(22) Filed: Mar. 10, 2009

(65) Prior Publication Data

US 2009/0200839 A1    Aug. 13, 2009

(51) Int. Cl.
*B60N 2/235* (2006.01)
(52) U.S. Cl. .................... 297/378.12; 297/124
(58) Field of Classification Search .................. 297/124, 297/125, 378.12, 378.14
See application file for complete search history.

(56) References Cited

U.S. PATENT DOCUMENTS

| | | | |
|---|---|---|---|
| 3,540,777 A | | 11/1970 | de Beaumont |
| 5,052,748 A | * | 10/1991 | Fourrey et al. ................ 297/124 |
| 5,997,090 A | * | 12/1999 | Baloche et al. ........... 297/367 R |
| 6,464,299 B1 | * | 10/2002 | Castagna .................. 297/378.12 |
| 6,513,876 B1 | * | 2/2003 | Agler et al. ............... 297/378.14 |
| 7,073,861 B2 | * | 7/2006 | Ichikawa et al. ........... 297/378.1 |
| 7,114,779 B2 | * | 10/2006 | Thiel et al. ................ 297/378.12 |
| 7,210,734 B1 | * | 5/2007 | Yetukuri et al. ................ 297/61 |
| 7,300,109 B2 | * | 11/2007 | Hofmann et al. ............. 297/362 |
| 7,419,217 B2 | * | 9/2008 | Ishizuka .................. 297/378.12 |
| 2004/0056523 A1 | * | 3/2004 | Grable et al. ............ 297/378.12 |

FOREIGN PATENT DOCUMENTS

| | | |
|---|---|---|
| DE | 198 37 051 A1 | 3/2000 |
| DE | 200 02 063 U1 | 5/2000 |
| DE | 695 15 264 T2 | 12/2000 |
| DE | 103 45 650 A1 | 5/2005 |
| DE | 10 2004 013 271 A1 | 10/2005 |
| EP | 0 756 961 A2 | 2/1997 |
| WO | 97/28019 | 8/1997 |

OTHER PUBLICATIONS

German Examination Report (Jul. 6, 2007).

* cited by examiner

*Primary Examiner* — Peter R. Brown
(74) *Attorney, Agent, or Firm* — Fletcher Yoder P.C.

(57) ABSTRACT

A vehicle seat includes a seat part and a backrest. The backrest has a first axis of rotation and is rotatable about the first axis through at least 90° from a normal position into a loading position. The backrest has pivoting means and is transferable into an armrest position by the pivoting means. A predominant part of the backrest is mounted higher in the armrest position than in the loading position.

9 Claims, 5 Drawing Sheets

VEHICLE SEAT WITH A ROTATABLE AND ESSENTIALLY DISPLACEABLE BACKREST

CROSS REFERENCE TO RELATED APPLICATIONS

This application claims priority from and the benefit of PCT Application No. PCT/EP2007/00791, filed on Sep. 11, 2007; and German Patent No. DE 10 2006 043 205.3, filed on Sep. 11, 2006; both entitled "Vehicle Seat with a Rotatable and Essentially Displaceable Backrest", which are herein incorporated by reference.

BACKGROUND

The present invention relates to a vehicle seat with a seat part and a backrest, the backrest having a first axis of rotation, and the backrest being rotatable by the first axis of rotation through at least 90° about the first axis of rotation from a normal position into a loading position.

Similar devices are known in general. For example, the publication U.S. Pat. No. 3,666,319 A describes an armrest which can be adjusted between a folded-in and an unfolded position. In this case, the movement of the armrest is controlled by a component. However, the disadvantage of the device is that the armrest is merely part of a backrest and cannot itself take over the function of a fold-down vehicle seat if the need arises.

The present invention is therefore based on the object of providing a vehicle seat which can also be used as an armrest and which does not have the defects of the devices known from the prior art, and is also easy to operate, robust and cost-effective to produce.

SUMMARY

The object is achieved by a vehicle seat with a seat part and a backrest, the backrest having a first axis of rotation, and the backrest being rotatable by the first axis of rotation through at least 90° about the first axis of rotation from a normal position into a loading position, the backrest having a pivoting means, the backrest being transferable into an armrest position by the pivoting means, and the predominant part of the backrest being mounted higher in the armrest position than in the loading position. By this means, it is advantageously possible, according to the invention, to use the vehicle seat both in the function as a vehicle seat and allow individuals (occupants) to sit thereon, and also to use parts of the vehicle seat as an armrest in order to provide an occupant with a special level of comfort by means of an armrest. In addition, the backrest of the vehicle seat can be rotated into a loading position, thus creating storage space in the vehicle interior. According to the invention, it is accordingly possible for the vehicle seat to carry out a plurality of functions and to be specifically matched to the requirements of the vehicle occupants or of the vehicle driver without having to be remodeled in a complicated manner. The predominant part of the backrest, which is mounted higher in the armrest position than in the normal position, is in particular the lower part, preferably the lower half, of the backrest.

The backrest is preferably rotated about a second axis of rotation for the transfer of the backrest of the vehicle seat into the armrest position. The second axis of rotation is preferably located in front of the first axis of rotation in the direction of the seat part and above the first axis of rotation with respect to the seat part. It is advantageously possible, by means of the rotation of the backrest about the second axis of rotation, to mount a predominant part of the backrest higher in the armrest position than in the loading position. By this means, the use of the backrest as an armrest is substantially more comfortable and the level of comfort for the occupants is increased. In addition, the backrest is substantially displaced forward by means of the rotation about the second axis of rotation, and therefore the end region of the backrest (lower region in the normal position) cannot strike during rotation against frame parts of the vehicle, in particular against the vehicle body. In the context of the invention, the end region of a backrest is to be understood as meaning the part which lies or would lie opposite a head restraint and which is substantially in contact with the seat part. Frame part is to be understood as meaning all of the components of a vehicle (in particular body parts) to which possible vehicle interior components can be fastened. Such vehicle interior components may be, for example, the vehicle seats of a rear seat bench.

The normal position of a vehicle seat is to be understood as meaning when the backrest and the seat part are arranged substantially at right angles to each other, with the seat part being in a substantially horizontal plane and with the backrest being substantially in an upright position. By contrast, in the loading position, the backrest should be substantially in contact with the seat part in the horizontal plane. An armrest position within the context of the invention is to be understood, by contrast, as meaning when the backrest is approximately horizontal but the predominant part of the backrest is not in contact with the seat part. Preferably, only the head restraint fitted at the upper end of the backrest is in contact with the seat part. An armrest position, in which the backrest is mounted substantially horizontally with respect to the seat part, but is at a defined distance from the seat part and has no contact with the seat part, would also be conceivable.

The second axis of rotation is particularly preferably a virtual axis of rotation determined by the pivoting means. The virtual second axis of rotation makes it particularly advantageously possible to use the advantages (positioning of the backrest relative to the seat part) of the second axis of rotation without having to accept the disadvantages of a real axis of rotation located in the position of the second axis of rotation. The seat comfort in particular is increased for occupants by means of the virtual second axis of rotation, since no hard components of the second axis of rotation can press through the backrest cushion. A greater meat to metal distance in the case of the first axis of rotation and the possibility of a space-saving arrangement of the backrest in relation to the vehicle body are therefore advantages which are afforded by the second axis of rotation.

The vehicle seat preferably has a further backrest. The further backrest can likewise be rotated from a normal position into a loading position. The further backrest, preferably together with a further seat part, forms, for example, a 40% part of a vehicle rear bench. The backrest and the seat part preferably form a 20% part of a vehicle rear bench. In one embodiment, the seat part and the further seat part can form a cohesive seat part such that there is only one seat part for the 20% and the 40% parts together. In the case of separate seat parts (the 20% part and 40% part each have a seat part), it is preferably possible, according to the invention, to remove both the 20% part and the 40% part individually in order thereby to provide very flexible storage space in the vehicle interior as a function of the situation.

The backrest and the further backrest preferably form a common, preferably substantially horizontal, plane in the loading position. This advantageously creates storage space in the vehicle, as a result of which even transportation of relatively large articles is possible. In this case, the backrest and the further backrest preferably form a horizontal plane in order to facilitate the loading of the vehicle, since no inclinations of the loading surface have to be overcome or taken into consideration during the loading. In addition, in the case of a horizontal loading surface, even relatively large articles can be transported without sub-regions of the relatively large article striking against the vehicle roof lining.

In a preferred embodiment, the pivoting means is a four-bar mechanism. By means of said four-bar mechanism, the backrest can be rotated about the second virtual axis of rotation, as a result of which the backrest is substantially displaced forward and the predominant part of the backrest is mounted higher than in the loading position. It is advantageous, according to the invention, to use a four-bar mechanism as the pivoting means, since this ensures stable construction of the backrest in the armrest position. A person skilled in the art understands that, for example, by supporting an elbow on the backrest in the armrest position, a force acts on the armrest. Depending on the position at which the force acts on the backrest in the armrest position, a lever effect is produced and, accordingly, a (heavy) loading of the backrest in the armrest position as a function of the lever effect. Accordingly, the backrest has to be held in the armrest position in such a manner that, even in the event of large applications of force, components of the backrest, in particular of the pivoting means, cannot be damaged.

In another preferred embodiment, the pivoting means has a gearwheel and a tab. The gearwheel is preferably fastened in a rotationally fixed manner to the backrest and meshes with a toothing of the tab. The tab can furthermore be rotated about the first axis of rotation. In the normal position, the gearwheel is located in a rear stop position of the tab. If the backrest is rotated from the normal position into the armrest position, the gearwheel migrates forward on the toothing in the direction of the seat part, with the tab not changing its position relative to the seat part. By this means, the predominant part of the backrest is displaced forward in the direction of the seat part. If the backrest is to be rotated into the loading position, then both the backrest and the further backrest are rotated about the first axis of rotation. In the process, the tab pivots forward about the first axis of rotation in the direction of the seat part, as a result of which the gearwheel migrates to the rear stop position of the tab again (transition from armrest position to loading position) or remains at the rear stop position (transition from normal position to loading position). By this means, it is advantageously possible for the backrest to be rotated into a loading position without a predominant part of the backrest being mounted higher. The formation of a horizontal plane between the backrest and the further backrest in the loading position is advantageously possible in this case.

The pivoting means is preferably connected to the seat part and the backrest of the vehicle seat. By this means, the pivoting means can be inserted and fitted fixedly in the vehicle. For the fastening, use can be made of any fastening means which permits the movement (for example rotation about the first axis of rotation) which parts of the pivoting means pass through in order to change the position of the vehicle seat.

The pivoting means is particularly preferably blocked by a latching means. Latching means within the context of the invention is to be understood as meaning any means which is suitable for preventing inadvertent rotation of the backrest into an armrest position or normal position. A person skilled in the art understands that any latching means or any latching covering can be used. For example, a pawl with pawl latching could be used as the latching means. In order to release the latching means for the intentional rotation of the backrest, a lever first of all has to be released or pivoted such that the latching means is released. By means of the latching means, it is advantageously possible to prevent inadvertent rotation of the backrest, as may occur, for example, in the event of heavy braking of the vehicle. In particular, occupants on the rear seat bench cannot be injured or frightened here by a backrest which suddenly rotates. Within the context of the invention, there is also a further latching means which keeps the backrest in the armrest position. The backrest can therefore be prevented from pivoting back into the normal position when not being used in the armrest position.

There is advantageously a minimum distance between the first axis of rotation and a support surface of the backrest. By means of the minimum distance, occupants sitting on the vehicle seat do not come into contact with the (real) first axis of rotation. Uncomfortable sitting or pain from sitting for a prolonged period in contact with hard components of the first axis of rotation are therefore prevented, and the seat comfort is increased. The minimum distance between the support surface and first axis of rotation is preferably at least 20 mm, more preferably at least 30 mm and particularly preferably 40 mm. Disadvantages of a first axis of rotation mounted in this manner (the end region of the backrest passes to the rear in the direction of the seat part and may strike against frame parts) are eliminated, according to the invention, by means of the virtual second axis of rotation which forms the pivoting means.

The vehicle seat with the backrest and further backrest is particularly preferably part, preferably a 60% part, of a rear bench of a vehicle. It is advantageously possible in this case, by means of rotation of the backrest and of the further backrests into the loading position, to change the rear seat bench in such a manner that further storage space in addition to the trunk space is produced in the vehicle. However, it is also conceivable according to the invention for the vehicle seat to be a passenger seat of a vehicle and, by means of a particular design of the rear side of the backrest, for the latter to be used in the armrest position by the vehicle driver. For example, the rear side of the vehicle seat can have depressions into which the vehicle driver can place articles. In this case, preference is given in particular to articles which are to be transported within view or reach of the vehicle driver.

DRAWINGS

The invention is explained in more detail below with reference to exemplary embodiments which are illustrated in the drawing. However, the general inventive concept is not limited thereto.

DETAILED DESCRIPTION

Figure 1:
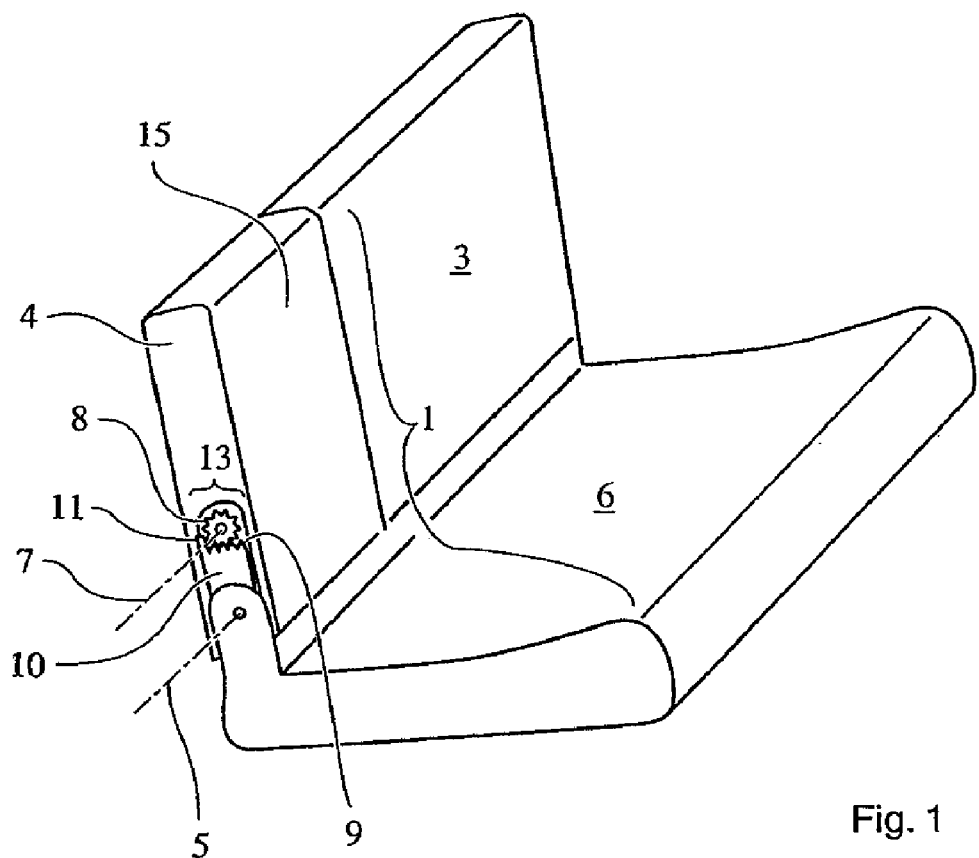
FIG. 1 shows, schematically, a vehicle seat in a normal position and with a first embodiment of a pivoting means.

FIG. 1 schematically illustrates a vehicle seat 1, with a backrest 4 and a seat part 6. A pivoting means 13 is connected both to the backrest 4 and to the seat part 6 and has a gearwheel 8 and a tab 10 with a toothing 9. The backrest 4 can be rotated about a first axis of rotation 5. In this case, the first axis of rotation 5 is located at a minimum distance from the support surface 15 of the backrest 4 in order to increase the seat comfort of the vehicle seat 1 (for example with regard to the first axis of rotation 5 possibly pressing through). In the normal position, the gearwheel 8 is located in a rear stop position 11 of the tab 10 or on a stop 11. The second axis of rotation 7 which is virtual and is produced by the pivoting means 13 is also illustrated. FIG. 1 furthermore illustrates a further backrest 3. In this exemplary embodiment, the seat part 6 of the vehicle seat 1 is at the same time also seat part 6 for the further backrest 3. However, it is also conceivable for the backrest 4 and the further backrest 3, with in each case separate seat parts 6, to form a vehicle seat 1.

Figure 2:
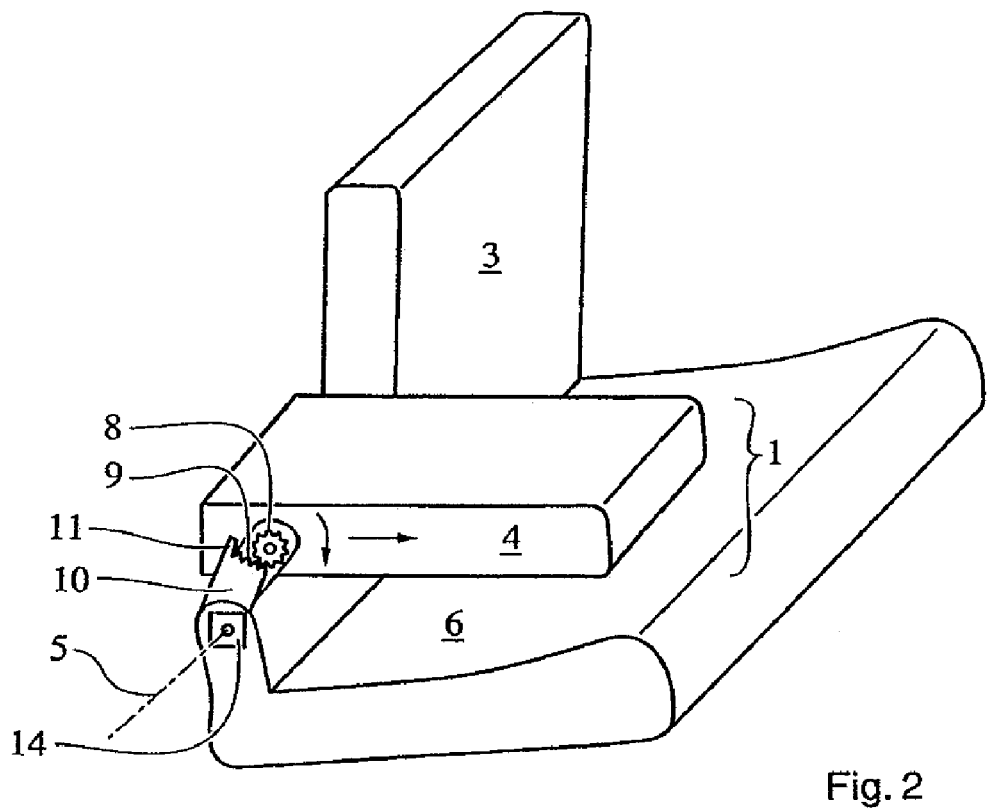
FIG. 2 and FIG. 4 illustrate, schematically, the vehicle seat with the first embodiment of the pivoting means, with the backrest being rotated into an armrest position.

FIG. 2 shows, schematically, the vehicle seat 1 in an armrest position. By rotation of the backrest—partially about the first axis of rotation 5 and partially about the second axis of rotation 7—the gearwheel 8 migrates forward along the toothing 9 in the direction of the seat part 6 and therefore leaves the rear stop position 11 of the tab 10. The tab 10 remains unchanged in its position in this case. In the example, the backrest 4 has no contact with the seat part 6. A latching means 14 which is intended to prevent inadvertent rotation of the backrest 4 is located in the region of the first axis of rotation 5. The further backrest 3 which remains upright in the armrest position of the backrest 4 is also illustrated.

Figure 3:
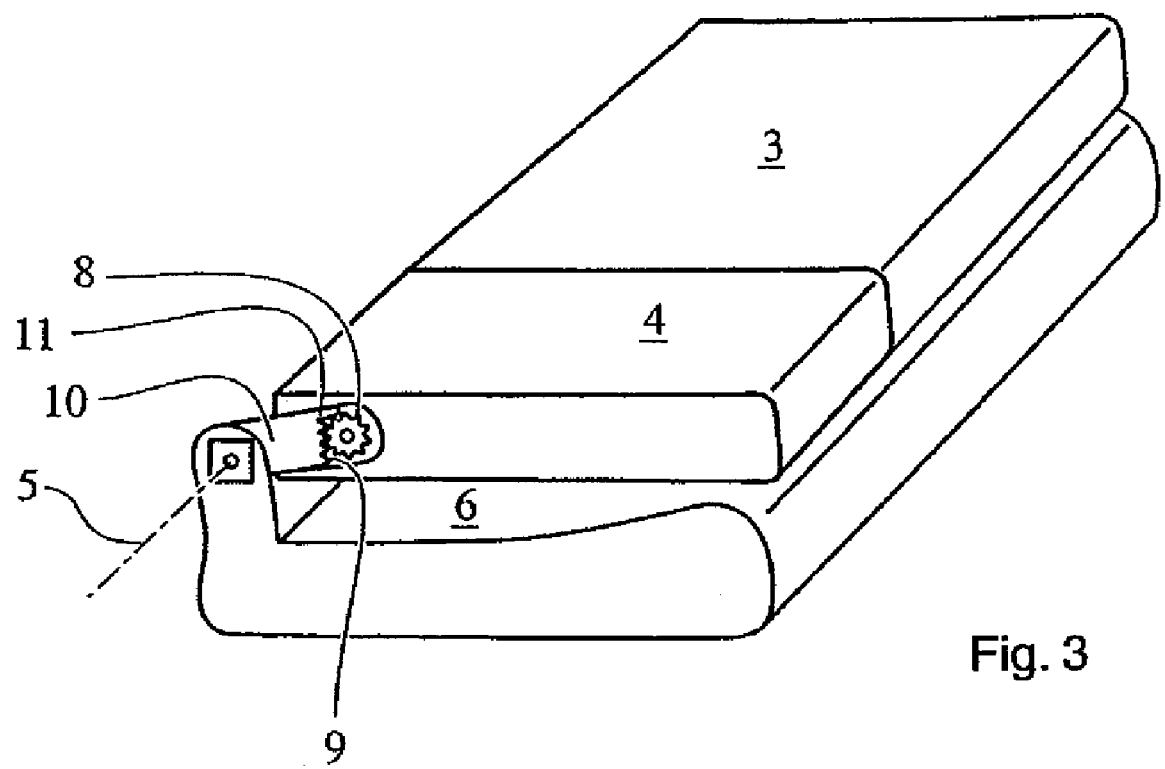
FIG. 3 shows, schematically, the vehicle seat with the first embodiment of the pivoting means, with the backrest rotated into a loading position.

FIG. 3 illustrates the backrest 4 in the loading position. In this case, the backrest 4 together with the further backrest 3 is rotated about the first axis of rotation 5 until the backrest 4 and the further backrest 3 are in contact with the seat part 6 or are substantially horizontal. The tab 10 pivots forward about the first axis of rotation 5 in the direction of the seat part 6. The gearwheel 8 remains in the rear stop position 11 in the toothing 9 (starting from the normal position during a folding-down operation) or the gearwheel 8 migrates along the toothing 9 to the rear stop position 11 (starting from the armrest position during a folding-down operation).

Figure 4:
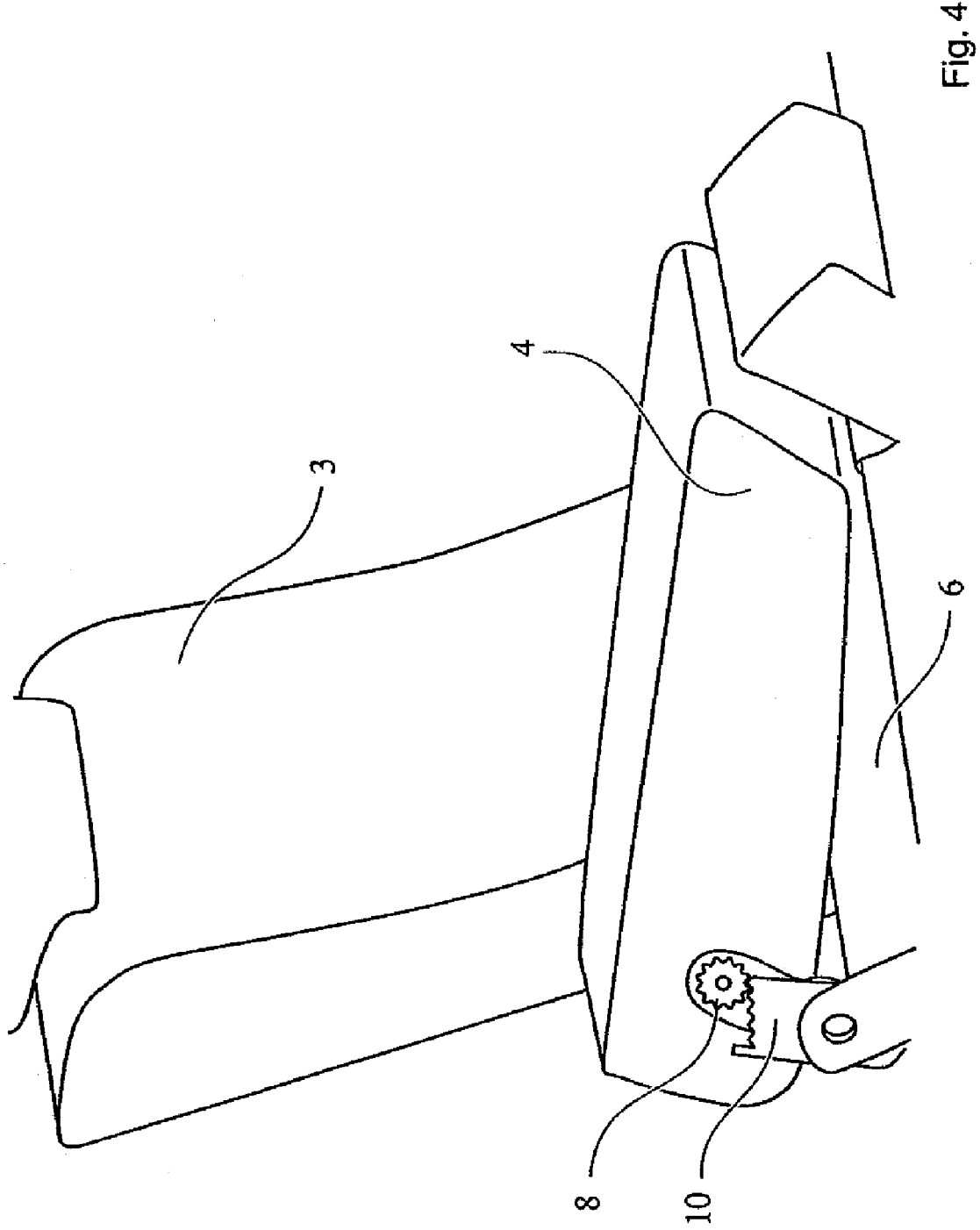

FIG. 4 shows, schematically, the backrest 4 in the armrest position, with the further backrest 3 adopting the normal position. The gearwheel 8 also migrates forward here in the direction of the seat part 6 and is located in a front region of the tab 10. In this exemplary embodiment, the head restraint of the backrest 4 is in contact with the seat part 6.

Figure 5:
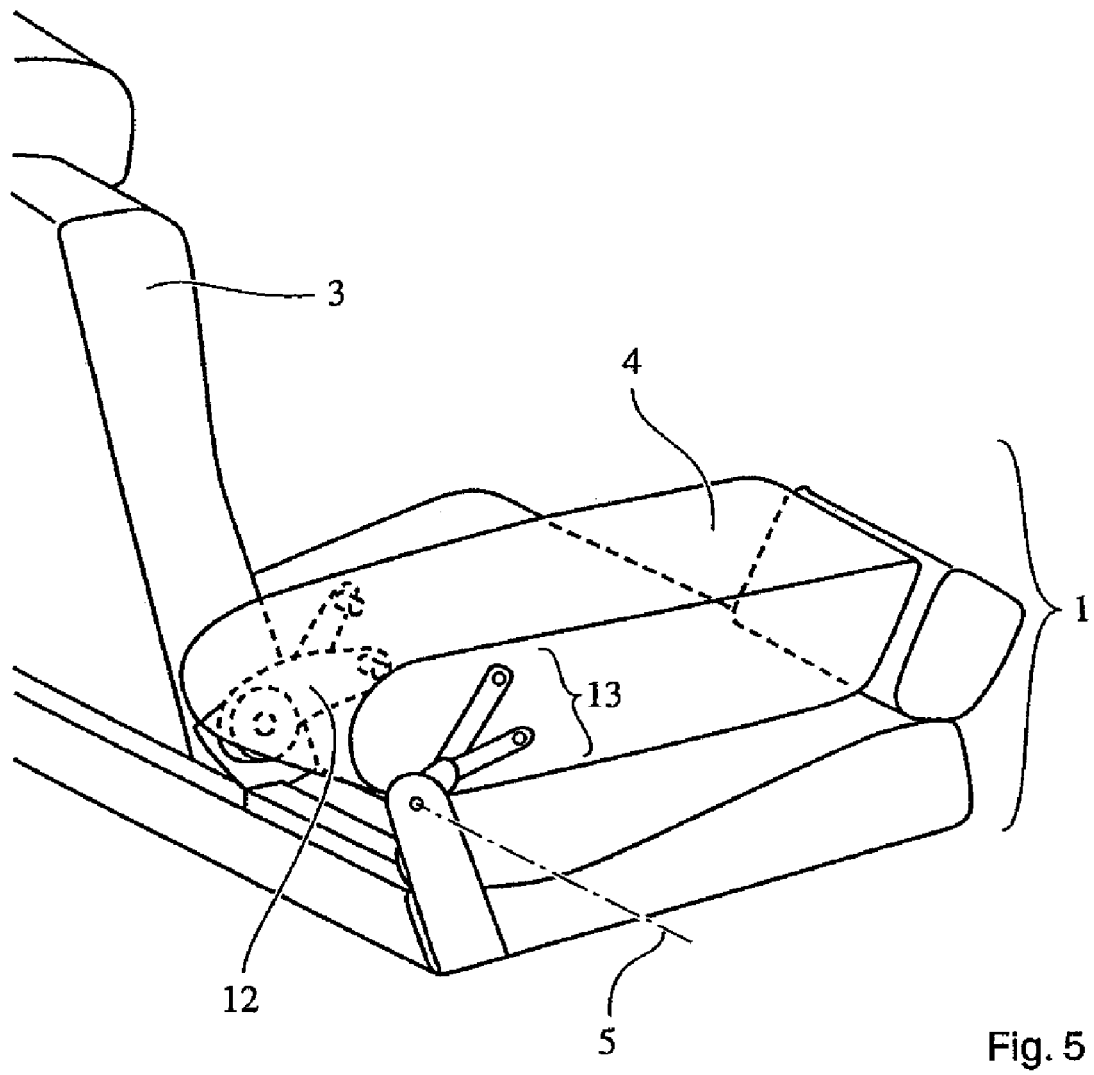
FIG. 5 shows, schematically, the vehicle seat, the backrest is rotated into the armrest position, and the pivoting means in this example is a four-bar mechanism.

FIG. 5 illustrates the vehicle seat 1, with a four-bar mechanism 12 being provided in this example as the pivoting means 13. The backrest 4 has been rotated and is in the armrest position. The second backrest 3 is illustrated here in a normal position. If the backrest 4 adopts a loading position, the four-bar mechanism is essentially completely extended (not illustrated).

Figure 6:
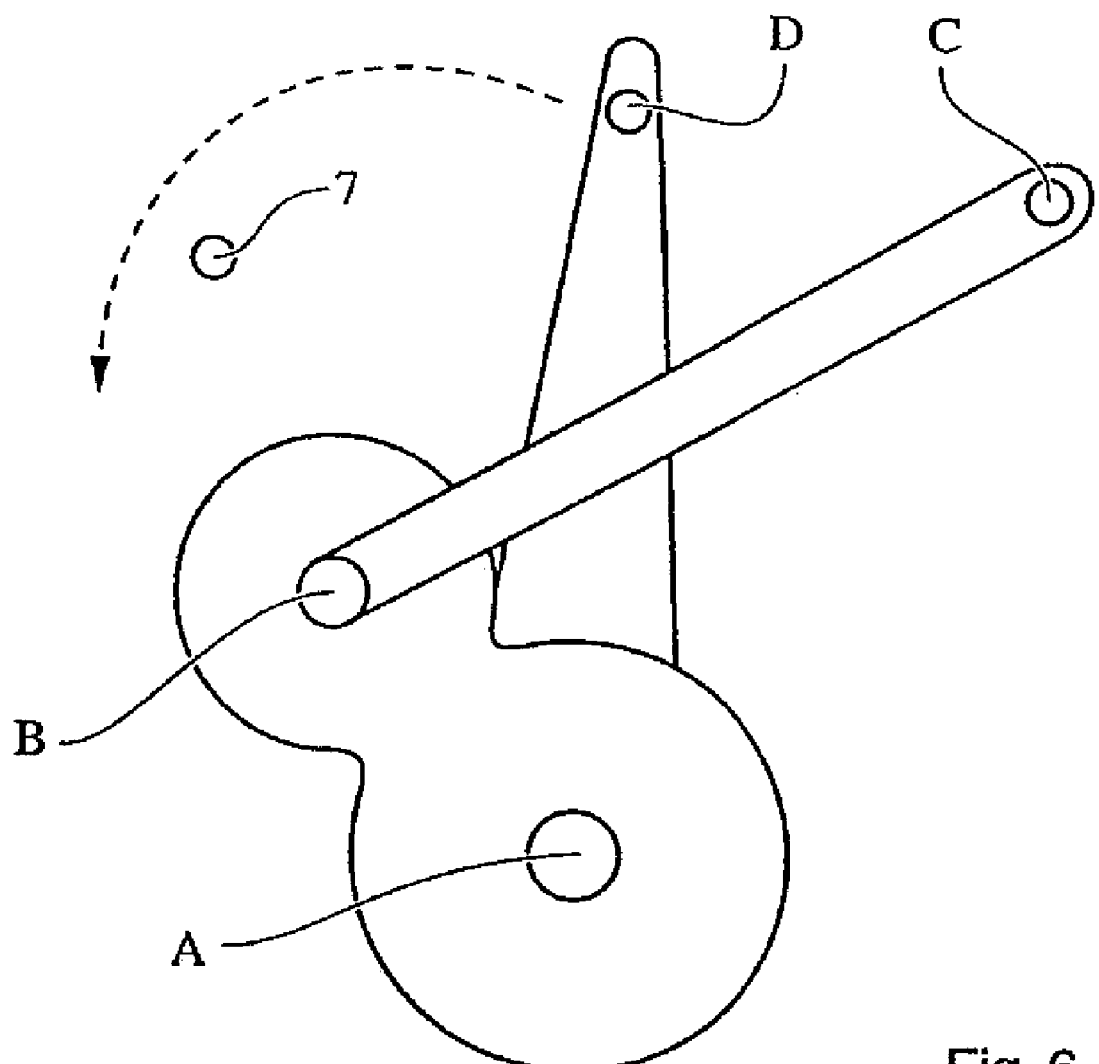
FIG. 6 illustrates, schematically, the four-bar mechanism.

FIG. 6 shows, schematically, the four-bar mechanism 12 its joint with points A, B, C, D. A first lever is produced between the points A and B, a second lever between the points A and D, a third lever between the points B and C, and a fourth lever between the points C and D. However, the points C and D are fixedly connected rotatably to the backrest 4. In the normal position and in the armrest position, the points A and B are fixedly connected to the seat part 6. During a rotation of the backrest from the normal position into the armrest position, the point D moves on a semicircular path around the point A, as illustrated, and at the same time the point C moves on a semicircular path around the point B. By this means, a virtual second axis of rotation 7 is produced approximately at the point shown in FIG. 1. When the further backrest 3 is folded down from the normal position into the loading position, the entire four-bar mechanism 12 is rotated about the point A which essentially coincides with the first axis of rotation 5. In this case, the four-bar mechanism remains essentially entirely extended.

The invention claimed is:

1. A vehicle seat comprising:
   a seat part;
   a backrest having a first axis of rotation, wherein the backrest is rotatable about the first axis of rotation through at least 90° from a normal position into a loading position; and
   a pivoting means configured to rotate the backrest about the first axis of rotation and about a second axis of rotation into an armrest position, wherein a predominant part of the backrest is mounted higher in the armrest position than in the loading position, and the second axis of rotation is a virtual axis of rotation determined by the pivoting means;
   wherein the pivoting means comprises a gearwheel rotationally fixed to the backrest, and a tab extending from the seat part to the gearwheel, wherein the tab is pivotally mounted to the seat part, the tab is configured to support the backrest, and the tab is configured to facilitate rotation of the backrest about the first axis, wherein the tab comprises a toothing configured to interface with the gearwheel, and rotation of the backrest into the armrest position, via partial rotation about the first axis and partial rotation about the second axis, drives the gearwheel to migrate along the toothing.

2. The vehicle seat as claimed in claim 1, wherein the vehicle seat has a further backrest pivotally coupled to the seat part and being rotatable about the first axis of rotation through at least 90° from the normal position into the loading position.

3. The vehicle seat as claimed in claim 2, wherein the backrest and the further backrest form a common plane in the loading position.

4. The vehicle seat claimed in claim 3, wherein the common plane is substantially horizontal.

5. The vehicle seat as claimed in claim 2, wherein the vehicle seat, including the backrest and further backrest is part of a rear bench of a vehicle.

6. The vehicle seat as claimed in claim 5, wherein the vehicle seat extends over approximately 60% of the rear bench of the vehicle.

7. The vehicle seat as claimed in claim 1, wherein the pivoting means is connected to the seat part and the backrest of the vehicle seat.

8. The vehicle seat as claimed in claim 1, comprising a latching means coupled to the pivoting means and configured to selectively block rotation of the backrest about the first axis, the second axis, or a combination thereof.

9. The vehicle seat as claimed in claim 1, wherein the first axis of rotation is positioned at least about 20 mm behind a backrest support surface that faces forwardly while the backrest is in an upright position.

* * * * *